Patented Aug. 23, 1949

2,479,918

UNITED STATES PATENT OFFICE 2,479,918

STABILIZED VINYL CHLORIDE RESINS

John K. Fincke, Dayton, and Earl W. Gluesenkamp, Centerville, Ohio, assignors to Monsanto Chemical Company, St. Louis, Mo., a corporation of Delaware No Drawing. Application April 15, 1948,
Serial No. 21,317

6 Claims. (Cl. 260—45.75)

This invention relates to methods of stabilizing vinyl chloride resins against the discoloration which is usually induced by elevated temperatures. More particularly it relates to the method of compounding polyvinyl chloride and vinyl chloride copolymers to enable them to withstand the action of heat and ultra violet light.

When polyvinyl chloride or copolymers of substantial proportions of vinyl chloride and minor proportions of other mono olefinic compounds are subjected to elevated temperatures or ultra violet light, they soon become discolored and ultimately light transmission properties are destroyed. A wide variety of stabilizing agents have been used to prevent or minimize the deterioration of the resins. Many of the stabilizing agents are effective for only short periods of time, others are effective only in specific formulations. Compounds such as organo tin compounds have been used, but many of these are incompatible and therefore not suitable when transparent films are to be produced.

The primary purpose of this invention is to provide a completely compatible organo tin derivative comparable to the aryl tin derivatives in stabilizing action. A further purpose is to provide an improved stabilizer for vinyl chloride polymers.

It has been found that tetra-alpha-thienyl tin is an excellent heat and light stabilizing agent when incorporated in vinyl chloride polymers. This compound is compatible and an effective stabilizer over a wide range of proportions, for example from 0.1 percent by weight to five percent.

The vinyl chloride resins useful in the practice of this invention are polyvinyl chloride, and copolymers of at least 70 per cent of vinyl chloride and up to 30 percent of other polymerizable mono olefinic monomers compatible with vinyl chloride, for example vinyl maleate and other vinyl esters of monocarboxylic acids, ethyl maleate, ethyl fumarate and other alkyl esters of maleic and fumaric acids, methyl acrylate, methyl methacrylate and other alkyl esters of acrylic and methacrylic acids, and vinylidene chloride. These polymers and copolymers may be prepared by any of the well known methods, but the polymerization in aqueous emulsion is the most important method of preparation.

The method of stabilizing the vinyl chloride involves merely the incorporation of the tetra-alpha-thienyl tin by physical admixture. Generally roll mills and Banbury type mixers have been found to be effective. The resins may be compounded with or without plasticizers, depending upon the ultimate use of the polymer. If no plasticizer is used the tetra-alpha-thienyl tin may be dispersed in an emulsion of the polymer, but in most cases it will be found desirable to use plasticizers because the distribution of the tetra-alpha-thienyl tin by milling and the fabrication of the stabilized resin are thereby facilitated. The use of the plasticizer also enables the compounding at lower temperatures and thereby other deleterious effects of elevated temperatures are avoided. Suitable plasticizing agents for the vinyl resins are dioctyl phthalate, tricresyl phosphate, dibutyl sebacate, polyesters prepared from aliphatic dibasic acids and aliphatic dihydric alcohols suitably modified with monobasic fatty acids.

Further details of the practice of this invention are set forth with respect to the following example.

Example

A series of 100 gram samples of polyvinyl chloride were used to compare the stabilizing effect of tetra-alpha-thienyl tin and comparable commercially available stabilizers, for example tetra phenyl tin and tetra butyl tin. The polyvinyl samples were each blended with 50 grams of dioctyl phthalate and thoroughly mixed. The stabilizing agents were blended into the various polyvinyl chloride samples on a laboratory roll mill heated to 300° F. The samples were thoroughly mixed for five minute periods and then rolled into sheets 0.020 inch in thickness. Samples cut from these sheets were subjected to light transmission tests in accordance with the A. S. T. M. specification D-672-44T. The following table shows the percent of light transmitted prior to subjecting the samples to heat and after one-half hour and one hour periods of heat at 160° C.

| Stabilizer | Light Transmission | | |
|---|---|---|---|
| | 0 hours | ½ hour | One hour |
| | Percent | Percent | Percent |
| Tetra-alpha-thienyl tin | 89 | 86 | 79 |
| Tetra butyl tin | 86 | 54 | 44 |
| Tetra phenyl tin | 75 | 69 | 69 |

The samples blended with tetra-alpha-thienyl tin and tetra butyl tin were entirely transparent, whereas the sample utilizing tetra phenyl tin was seriously incompatible.

Although the invention has been described with respect to a specific example, it is not intended that the details thereof shall be construed as limitations upon the scope of the invention except to the extent incorporated in the following claims.

We claim:

1. A vinyl chloride resin stabilized against discoloration at elevated temperatures, which comprises a polymer of which at least 70 percent of the monomeric components is vinyl chloride, said polymer containing intimately dispersed therein from 0.1 to five percent of tetra-alpha-thienyl tin.

2. A stabilized polyvinyl chloride which comprises polyvinyl chloride having intimately dispersed therein from 0.1 to five percent of tetra-alpha-thienyl tin.

3. A stabilized vinyl chloride resin which comprises a copolymer of at least 70 percent vinyl chloride and up to 30 percent of a monomeric substance of the group consisting of vinyl esters of carboxylic acids, alkyl acrylates, alkyl methacrylates, alkyl fumarates, alkyl maleates and vinylidene chloride, said resin containing intimately dispersed therein from 0.1 to five percent of tetra-alpha-thienyl tin.

4. A vinyl chloride resin stabilized against discoloration at elevated temperatures, which comprises a polymer of which at least 70 percent of the monomeric components is vinyl chloride, said polymer containing intimately dispersed therein a plasticizer and from 0.1 to five percent of tetra-alpha-thienyl tin.

5. A stabilized polyvinyl chloride which comprises polyvinyl chloride having intimately dispersed therein a plasticizer and from 0.1 to five percent of tetra-alpha-thienyl tin.

6. A stabilized vinyl chloride resin which comprises a copolymer of at least 70 percent vinyl chloride and up to 30 percent of a monomeric substance of the group consisting of vinyl esters of carboxylic acids, alkyl acrylates, alkyl methacrylates, alkyl fumarates, alkyl maleates and vinylidene chloride, said resin containing intimately dispersed therein a plasticizer and from 0.1 to five percent of tetra-alpha-thienyl tin.

JOHN K. FINCKE.
EARL W. GLUESENKAMP.

No references cited.